Patented Dec. 17, 1946

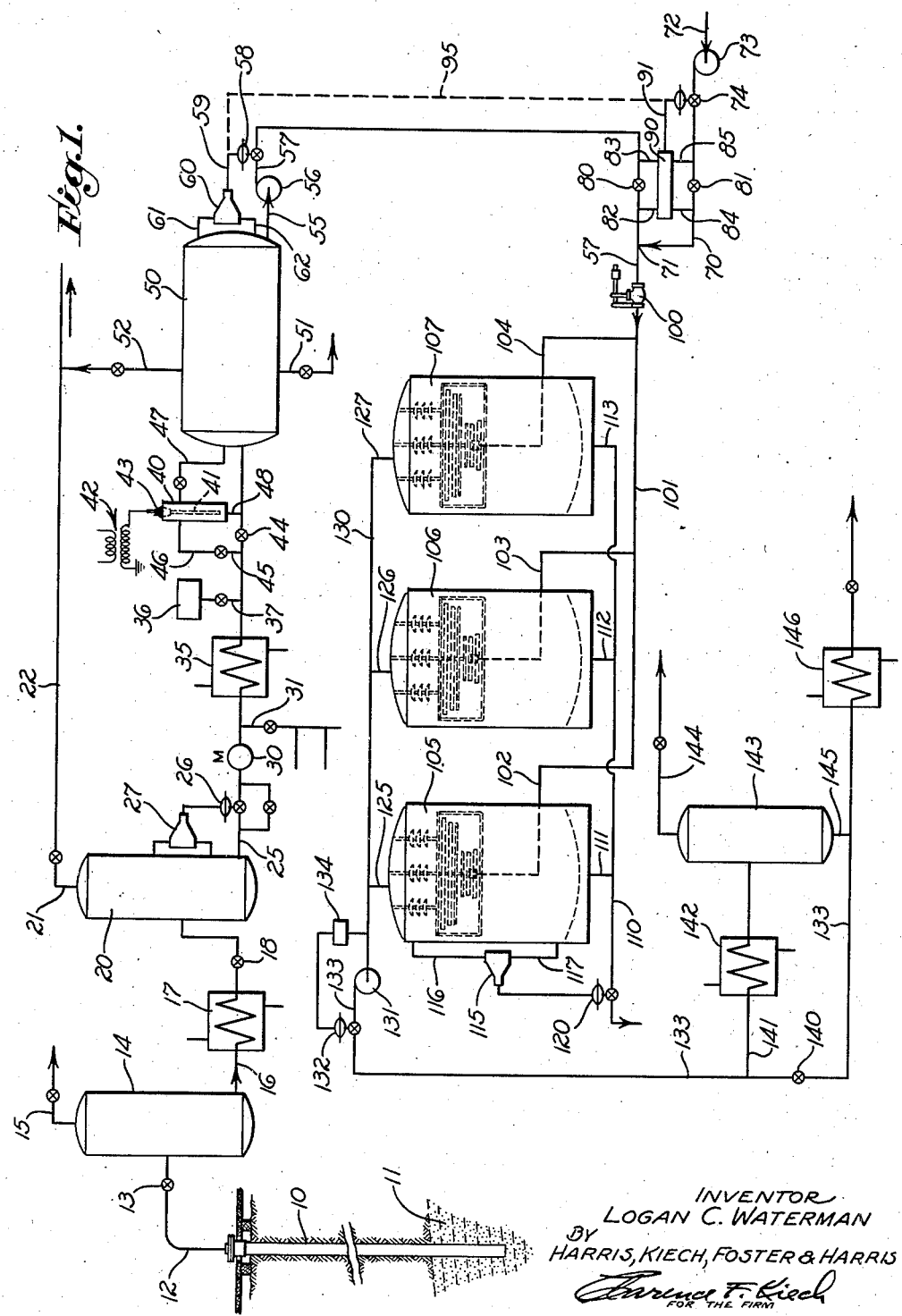

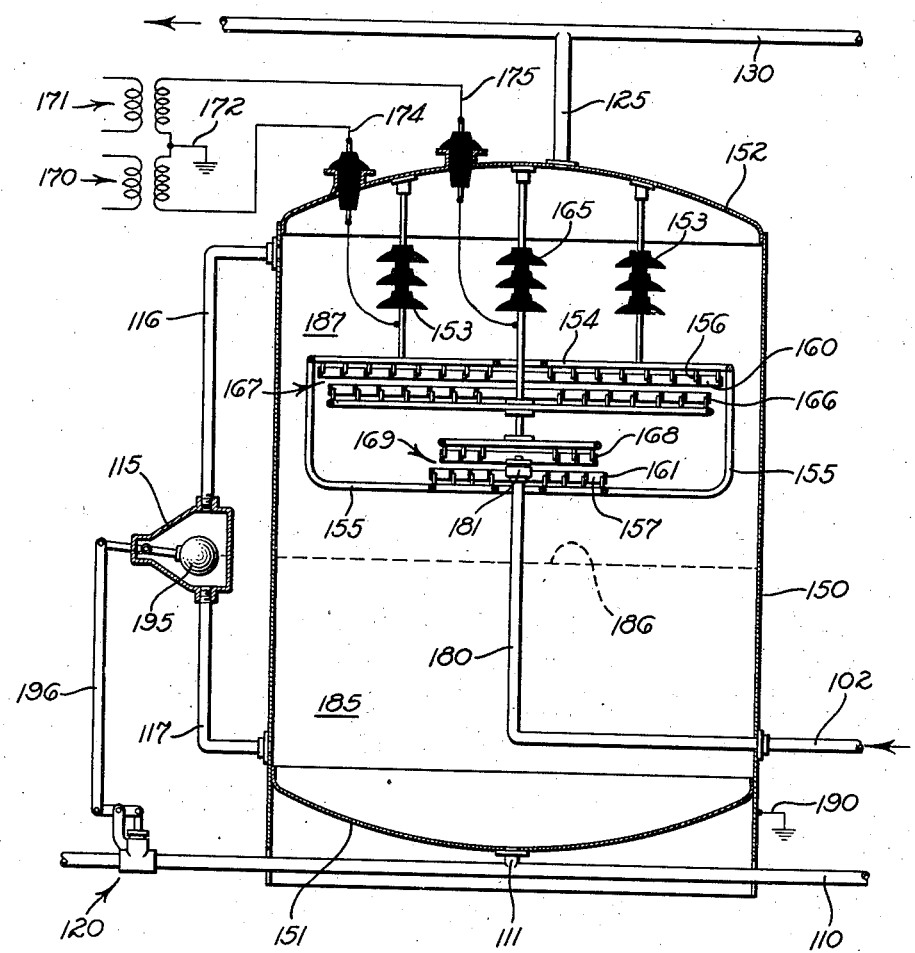

2,412,791

UNITED STATES PATENT OFFICE 2,412,791

METHOD FOR PURIFYING MINERAL OILS

Logan C. Waterman, Houston, Tex., assignor to Petrolite Corporation, Ltd., Wilmington, Del., a corporation of Delaware Original application March 4, 1940, Serial No. 322,093. Divided and this application October 13, 1941, Serial No. 414,791

2 Claims. (Cl. 204—190)

This invention relates to method and apparatus for treating oils and, more particularly, to an electric method and apparatus for the purification of crude petroleum.

Crude petroleum frequently contains water-dispersible impurities. These impurities may be either molecularly or ionically dispersible in water as in the case of water-soluble salts, or dispersible in water as solid particles as in the case of particles of sand or silt having water-wettable or water-wet surfaces. These impurities are most commonly represented by water-soluble salts which may be present in the oil as crystals or, more commonly, in the form of aqueous solutions of brine dispersed as fine emulsified droplets throughout the oil.

In United States Patent No. 2,182,145 to H. C. Eddy, an electrical process for the removal of saline and similar impurities from crude oil is disclosed, which provides for the subjection of a specially-formed synthetic emulsion to a high-tension electric field, thus producing coalescence of the dispersed droplets of the emulsion into masses of sufficient size to be readily removed from oil by gravitational methods, including settling. The synthetic emulsion is formed by dispersing relatively fresh water in the oil to form droplets which are coalesced with the brine droplets or other impurities in the oil by the action of the electric field, whereby the impurities become associated with the large coalesced masses and are readily separable from the oil.

It is an object of the present invention to provide improvements in method and apparatus relative to such an electric purification process.

In view of the extensive utilization of this process for the removal of brine and other saline impurities from crude oil, it is commonly termed a "desalting process." It is generally agreed that the salt or brine, which is so frequently found associated with crude petroleum and which thus requires subjection of the crude oil to a desalting process, becomes dispersed in the oil as the latter is brought to the surface or otherwise subjected to turbulent flow in the process of production. For example, the production flow into the well casing may comprise admixed streams of crude oil and brackish water and, in the turbulence of the flow to the surface and discharge from the well, the brackish water or brine becomes dispersed in fine droplets throughout the oil. These droplets are eventually stabilized by the adsorption of emulsifying agents at their interface and, as this adsorption progresses, the droplets become increasingly difficult to treat or coalesce with similar or other droplets. The degree of interfacial stabilization and the difficulty of coalescing these droplets with other droplets, typically those of added relatively fresh water, may be further increased by changes to which the oil is subjected subsequent to its production. For example, the oil as produced is normally at temperatures somewhat above normal atmospheric temperature. As the oil cools, its solvent power for emulsifying agents, such as asphalt, high molecular weight acids, and the like, may decrease, whereby these materials become more readily available for adsorption at and stabilization of the interface. In addition, the adsorbed materials may be reduced to below their melting point by such cooling, whereby a solidified interface is formed which is very difficult to treat.

The solvent power of the crude oil may also be decreased by partial vaporization of light hydrocarbons, such as may occur when the pressure on the freshly produced oil is substantially reduced or where the oil is allowed to weather or is otherwise stabilized, resulting in a condensation of heavy and/or solid emulsifying agents at the interface.

Effects other than reduced solvent power and increased adsorption may also be involved in the progressive increase in difficulty of purification as an oil is processed and/or stored. For example, the viscosity of the crude oil may become increased due to a lowered temperature and/or removal of light hydrocarbons, thus rendering the separation of impurities more difficult. The specific gravity is also modified, thus resulting in a lower gravity differential between the oil and water, with attendant decrease in settling rates.

It is an object of the present invention to provide a process of the kind described in which the crude oil as it is produced from the well, particularly an oil susceptible to the above-described stabilizing effects, is advanced as a continuously-flowing stream up to and through the steps of removing water-dispersible impurities by electric coalescence with added water, whereby the stabilizing effects of protracted storage are avoided.

It is a further object to provide a process in which such an advancing stream is at all times maintained under superatmospheric pressure, whereby volatile constituents may be maintained in the oil, the retention of these constituents serving to improve the purification by maintaining the oil in a more fluid condition, by maintaining potential stabilizing agents in a dissolved state, and the like.

It is also an object of the present invention to provide a process in which such a stream is maintained at an elevated temperature or at least withheld from prolonged exposure to low temperature, whereby precipitation and/or interfacial adsorption of stabilizing agents is prevented or minimized.

Another object of the invention is to remove free gas from the well-produced oil preparatory to further processing involving electrical purification of the oil.

Crude oils are normally subjected to a stabilization process designed to remove normally gaseous constituents, such as ethane, propane, butane, etc., and to produce a crude of lowered vapor pressure. In some instances, it is desirable to stabilize the crude prior to desalting, as when relatively high temperatures are found desirable for desalting. Such stabilization, however, frequently hastens the process of interfacial adsorption, and I have found the purification of a stabilized crude is best accomplished directly subsequent to stabilization without intervening storage. By combining stabilization with desalting, I am also able to realize an economy in heat since both processes are relatively high-temperature processes.

It is, accordingly, an object of the present invention to stabilize a crude oil prior to desalting and preferably immediately prior thereto, as by continuously advancing a stream of crude oil through a stabilizer and then through a desalter.

In many instances, the stabilization prior to desalting need not be complete, whereby a portion of the volatile constituents may be retained in the oil during desalting, the stabilization being completed subsequent to the desalting.

It is, accordingly, an object of the present invention to provide a process for removing salt and similar impurities from petroleum in which the steps incident to the salt removal are preceded, and in some instances followed, by the removal of volatile constituents from the oil.

It is a further object of the present invention to provide a process of the kind described in which the water-dispersible impurities are removed prior to the removal of all of the volatile constituents which it is required to remove for full stabilization of the crude.

The electric purification process of Eddy, supra, works best on oils of low water content. If the oil produced by the well contains but little water, for example not more than a few per cent, it may be desalted directly. Otherwise, the oil is best subjected to a dehydration treatment prior to desalting in order to remove at least a portion of the aqueous brine in order to produce an oil of relatively low water content for subjection to the desalting step. I find that the steps of purification are most effectively practiced on a freshly dehydrated oil, possibly due to the fact that the effect of the chemical or electric field employed in dehydration persists for some time and makes the residual brine droplets more readily coalescible with the added water.

It is an object of the present invention to dehydrate and desalt successively a continuously-advancing stream of crude oil, more particularly a stream having an uninterrupted flow from a source well or a group of wells.

By maintaining an advancing stream of oil under superatmospheric pressure, it may be very advantageously subjected to successive dehydration and purification steps, and such a stream is preferably maintained at superatmospheric temperature.

It is accordingly an object of the present invention to successively dehydrate and desalt a continuously-advancing stream of oil maintained under superatmospheric pressure and/or temperature, more particularly when such a stream is initially formed by a source well.

The steps of purification, particularly the separation of the electrically-coalesced masses of dilute brine, are preferably effected in the substantial absence of ebullition which is best prevented by imposing a pressure during treatment which is at least as great as any minimum pressure to which the oil has been previously subjected, and which is greater than the vapor pressure of the oil at the temperature of treatment. Similarly, the imposed pressure should exceed the vapor pressure of the water present in the treater.

It is accordingly an object of the present invention to provide a process for purifying a crude oil in which the crude oil production is maintained as a continuously-advancing stream subject to superatmospheric pressure up to and including the step of separating water-dispersible impurities, said last step being carried out at a superatmospheric pressure not less than the previous minimum pressure to which said stream is subjected.

It is a further object of the present invention to provide a plurality of electric purifying units arranged in parallel with respect to a stream of oil and to disperse water in such stream prior to its subdivision into parallel streams, whereby a better and more uniform operation of several units may be obtained.

It is a further object to provide an automatic control for the removal of water from said units, whereby similar interfacial levels may be maintained in the several units and whereby but one control mechanism is needed for the plurality of units.

It is also an object of the present invention to provide a proportioning control for the dispersal of water in the flowing oil stream and to provide a means for controlling the rate of flow of oil to the purifying units in response to the production of crude oil, more particularly in response to the level of said oil in a surge tank.

It is a further object of the present invention to provide a pressure-responsive control for removing purified oil from the purifying units.

Still further objects and aspects of the invention will become apparent in the following discussion of the drawings in which:

Figure 1 is a schematic representation of apparatus and flow lines suitable for carrying out one embodiment of my invention; and Figure 2 is a cross-sectional view of an electric treater adapted to coalesce and remove the dispersed phase from the synthetic emulsion as produced in this process.

Referring more particularly to Figure 1, a well casing 10 penetrates to oil-producing sands 11 and provides a passageway for the crude oil, usually commingled with more or less brine, to reach the surface. A flowing pressure well is indicated in the drawings, it being understood that other types of production, e. g., pumping, are likewise suitable in connection with the practice of the present process. The oil reaches the surface at a pressure dependent upon formation pressure and the depth of the well, and, in some instances, this pressure may be quite high, for example, 2000 lbs./sq. in., or more. This oil is transferred by means of a pipe 12 to a choke valve 13 where the pressure is reduced to some suitable value, for example, about 400 lbs./sq. in. From the choke valve 13, the mixture of gas and crude oil enters a gas separator 14 from whence high pressure gas is withdrawn by means of a line 15, the liquid constituents or crude oil collecting in the bottom of the separator 14 and being withdrawn through a line 16.

If desired, the crude may be further heated during its passage along pipe 16 by means of a heat interchanger 17. The pressure on the flowing stream is further reduced by passing through a valve 18 whence the oil is led into a flash tower 20. Gaseous constituents may be removed from the flash tower 20 by means of a line 21 feeding into a low pressure gas manifold 22. Liquid constituents are continuously removed from the bottom of flash tower 20 by means of a pipe 25, the flow being preferably regulated by an automatic valve 26 responsive to a float control 27 associated with the tower 20 and adapted to open and close valve 26 in accordance with the liquid level in the flash tower 20.

If desired, the crude flowing through the line 25 may be passed through a meter 30 and may be admixed with oil flowing in a manifold 31 adapted to receive crude similarly produced from other wells.

Further provision for modifying the temperature of the crude flowing through the line 25 is afforded by means of an interchanger 35. If this crude contains substantial water, provision is made for the dehydration, or at least partial removal, of the emulsified water from the crude. If it is desired to dehydrate the crude chemically, a proportioned small stream of emulsion-breaking chemical may be supplied from a tank 36 and introduced into the line 25 by means of a valved line 37.

If desired, the oil may be otherwise conditioned for purification, for example by means of electric treatment. Various types of electrical dehydrators are available and, in the drawings, only a very schematic representation of an electrical dehydrator is shown. Such a dehydrator comprises an outer shell 40, an inner electrode 41, and a transformer 42 supplying high potential alternating current to the inner electrode through an insulating bushing 43. The wet oil traversing line 25 may be diverted by closing a valve 44 and opening a valve 45 into a line 46 serving to introduce the wet oil into the space between the inner electrode 41 and the outer shell 40. If desired, dry oil may also be supplied to the treating space by pumping through a valved line 47. The electrically-treated mixture is re-introduced into line 25 by means of a transfer pipe 48 from which it flows into a horizontally-positioned tank 50 in which the forward velocity of the advancing stream is sufficiently reduced to permit settling of water from the treated mixture. This water may be withdrawn through a valve draw-off line 51. If desired, further vapors may be withdrawn from the oil in the tank 50 and passed to the manifold 22 by means of the valved line 52.

The dehydrated oil is removed from tank 50 by means of a pipe 55 connected to the suction of a centrifugal pump 56. The discharge of the pump 56 is passed into a line 57, the flow through which is controlled by means of an automatic valve 58. The valve 58 is operatively connected by a mechanical, hydraulic, pneumatic, or electrical means, or a linkage means, schematically indicated by numeral 59, to a float (not shown) in float housing 60 which is in free communication with the upper and lower portions of the tank 50 by means of lines 61 and 62, respectively. By this means, a substantially constant level is maintained in the tank 50, the discharge of pump 56 through line 57 being substantially equal to the crude input in the tank 50 apart from the slight decrease in volume due to withdrawal of water and/or vaporous constituents.

A stream of relatively fresh water is introduced into the stream of oil traversing line 57, suitably by means of a pipe 70 opening into pipe 57 at juncture 71. If the rate of oil flow is relatively constant, the stream of water may likewise be constant in quantity. Where there is considerable fluctuation in oil flow, however, I prefer to provide automatic proportioning between the streams of oil and water, whereby the latter may be kept within the desired limits, suitably from 10 to 20% of the volume of oil.

The drawings disclose a suitable means for automatically proportioning the two streams. Relatively fresh water derived from any suitable source is brought by means of a pipe 72 to the suction of a centrifugal pump 73, the discharge of which into line 70 is controlled by means of an automatic valve 74. A fixed orifice 80 is provided in line 57 to produce a pressure drop proportional to the square of the rate of flow of oil, and another orifice 81 is positioned in line 70 to produce the pressure drop proportional to the square of the rate of flow of water. These differential pressures, that is, the pressures above and downstream from the respective orifices, are transmitted by means of lines 82, 83, 84, and 85 to a control device 90 having a linkage means 91 to valve 74 and adapted to open said valve when the pressure drop across the orifice 81 is reduced below a predetermined ratio to the pressure drop across orifice 80 and to move the valve 74 toward a closing position when the pressure drop across the orifice 81 exceeds the predetermined ratio. The control device 90 is indicated only schematically since various devices well adapted to perform the desired functions are known to the art.

Another modification which is very advantageous in certain instances when it is not desired to use the orifice plates and associated equipment is to provide a linkage means, schematically indicated by dotted lines 95, between valve 74 and linkage means 59 which serves to actuate the throttle valve 58 on the discharge of the oil pump 56. In this manner, the oil discharged from pump 56 and the water discharged from pump 73 are simultaneously controlled in response to the oil level in tank 50.

The water introduced into the flowing oil stream at juncture 71 is, in most instances, at least partially dispersed in the oil by the turbulence of the flowing stream, but to obtain the desired degree of dispersion, the commingled stream is best subjected to a controlled agitation and shearing action, as by passage through a weight-loaded valve 100. The dispersion formed in the valve 100 is passed into a header 101 where it is split into three streams which are passed by means of lines 102, 103, and 104 into electric treaters 105, 106, and 107, respectively. In these treaters, the emulsion is subjected to the action of an electric field by means which will become more clear in subsequent discussion of Figure 2, and the treated mixture is permitted to settle into a lower body of water and an upper body of relatively dry oil having a salt content below a specified value. The three treaters 105, 106, and 107 are preferably similarly constructed and mounted at the same level so that the water effluent lines may be manifolded, thereby maintaining the interfacial level in each treater at approximately the same height. In the form shown in the drawings, a water manifold 110 is shown which is in open communication with the lower portions of treaters 105, 106, and 107 by means of pipes 111, 112, and 113, respectively. One of the treaters, namely, treater 105, is provided with a float chamber 115 openly communicating with the upper oil body by means of a pipe 116 and with the lower water body by any suitable means, typically by means of a pipe 117. As will presently be clear in the discussion of Figure 2, this chamber houses a float adapted to follow the interfacial level between the oil and water in the float chamber which corresponds to the interfacial level in treater 105. This float is operatively connected to a valve 120 in manifold 110 which serves to control the rate of discharge of water from the manifold. The interfacial level in treater 105 may thus be maintained substantially uniform and at the desired height, and, because of the manifold connections, the interfacial levels in the other treaters are likewise maintained at the same desired height.

The automatic discharge or bleeding of the water to maintain uniform interfacial levels is accomplished irrespective of what the absolute pressure in the treaters may be. I may, accordingly, provide a pressure-responsive control for discharging the oil from the treater, whereby the pressure therein may be maintained at any desired value. For this purpose, I withdraw oil from the upper portion of treaters 105, 106, and 107 by means of pipes 125, 126, and 127 which open into the oil manifold 130 leading to the suction of pump 131. An automatically controlled valve 132 is placed on the discharge line 133 of pump 131, the opening of which is made responsive to the pressure in manifold 130 by suitable pressure-sensitive means 134 so arranged that, when the pressure in manifold 130 exceeds the desired pressure, valve 132 is adjusted to a greater opening whereby the oil is more rapidly removed from the treating system and the pressure is reduced. It will be clear that the opposite reaction will occur to correct a pressure which is below the desired operating pressure.

If it is desired to further stabilize the oil subsequent to its desalting or purification, a valve 140 in line 133 may be closed and the oil passed by means of a pipe 141 through a heat interchanger 142 into a stabilization tower 143 from which the undesired highly volatile constituents may be removed by means of a line 144, the stabilized crude being withdrawn through a bottom line 145 and returned to the continuation of line 133 from which it may be passed to further distillation and/or cracking equipment, or, if it is desired to store the crude, it may be passed through a cooler 146. In instances where it is not desired or necessary to stabilize the crude, the valve 140 may be opened, permitting the crude going through line 133 to flow directly to further processing or to storage, as through cooler 146.

Figure 2 is a cross section showing details of treater 105. The treater comprises a cylindrical shell 150 closed at the ends by bottom and top plates 151 and 152 through which the pipes 111 and 125 communicate with the interior of the shell 150. Suspended from the head plate 152 by means of insulators 153 is a cross bar 154 from which depends another cross bar 155. Suspended immediately below the cross bar 154 and mechanically and electrically connected therewith is a series of concentric rings 156 coaxial with the treater shell. A similar series of concentric rings 157 is mounted on the top of cross bar 155. The rings 156 form a part of an electrode structure, designated generally as 160, and the series of rings 157 forms a part of an electrode structure, designated generally as 161. Also suspended from the head plate 152 by means of an insulator 165 is an electrode structure 166 cooperating with electrode structure 160 to form an upper treating space 167 and an electrode structure 168 cooperating with the lower electrode structure 161 to form a lower treating space 169. High potential alternating current is supplied by means of transformers 170 and 171 connected in series with a ground 172 therebetween. The high potential terminal of the transformer 170 is electrically connected with electrode structures 160 and 161 by means of an insulated lead 174, and the high potential terminal of transformer 171 is electrically connected by means of insulated lead 175 to the electrode structures 166 and 168.

The incoming emulsion flows through the pipe 102 which continues on into the interior of the treater to rise vertically in a centrally-positioned pipe 180 terminating in a discharge nozzle 181 positioned in the lower treating space 169 and adapted to discharge the incoming emulsion radially outward in a substantially horizontal plane throughout the treating space 169.

In the electric field, the droplets of the added water and droplets of brine or other suspended impurities are coalesced to masses of sufficient size to settle out from the oil and form a body of water or dilute brine 185 having an upper boundary or interface 186 separating it from a body of oil 187.

Further electric treatment is also provided by the upper treating space 167 through which the oil may pass as it rises or through which recycle currents may be set up due to the aspirating effect of the discharge nozzle 181, and also by an auxiliary treating field which is set up between the charged electrode structure 161 and the body of water 185, the latter, together with the treater shell, being grounded by means of the ground 190.

The float housing 115 is positioned exterior to the shell 150 at a height corresponding to the desired height of the interface 186 and, as indicated above, communicates by means of pipes 116 and 117 with the upper body of oil 187 and the lower body of water 185, respectively. The float 195 is shown connected by means of mechanical linkage 196 to valve 120 on the water manifold line 110, it being understood that any suitable type of linkage or operative connection may be established between the float and the automatic valve.

The step of dispersing water in the flowing oil stream at juncture 71 and weight-loaded valve 100, followed by subjection of the emulsion thus formed to the action of an electric field to coalesce the added water and saline or other dispersible impurities to masses separable from the oil, and separating these masses to obtain a purified oil, as in treaters 105, 106, and 107, constitutes the desalting or purification steps of the present process. The fundamentals of this process are discussed at length in the H. C. Eddy patent, supra, and need not be elaborated on here. As indicated above, the present improvement in such purification process rests, in part, upon the discovery that the purification process works best on freshly-produced oil which is not allowed to age to the degree that brine particles become highly stabilized with adsorbed emulsifying agents, and that any handling of the oil, either freshly produced or from storage, which increases the potential degree of adsorption such as cooling, partial vaporization, or the like, should be succeeded as rapidly as possible by subjection of the oil to the purification process before additional stabilization of the emulsion takes place to any substantial degree. The present process also presents further beneficial factors by providing for the dehydration of the oil immediately prior to desalting where dehydration is necessary, by providing for retention in the oil undergoing desalting of volatile constituents inherently favorable to the process of purification, and by providing various other factors.

The stabilization of the crude may take place in increasing degree in gas separator 14, flash tower 20, tank 50, and stabilization tower 143. In many instances, I prefer to conserve as much of the more volatile constituents as is possible in the crude subjected to purification since I find that they exercise a beneficial effect on the ease of coalescence and separation of the impurities and, accordingly, in such instances only the extremely volatile constituents, such as the fixed gases, methane, ethane, and the like, and a portion of propane and/or butane will be removed prior to the purification process, the crude being eventually stabilized and the requisite quantity of these volatile constituents being removed in the final stabilization step in tower 143 subsequent to purification.

In some instances, however, the advantages of substantially higher temperatures or the impracticality of maintaining excessive pressure in the purification step may overweight the advantages resident in the presence of liquefied volatile constituents in the oil and, in such instances, I may provide for the prior removal of these constituents so that there is substantial stabilization of the crude oil prior to purification, this greater degree of stabilization being maintained by the use of higher temperatures or lower pressures in the flash tower 20 and tank 50. The lower vapor pressure of the oil thus processed permits the use of higher temperatures without the imposition of excessive pressures during the purification process. The full advantages of this method of prior stabilization are not realized, however, unless the stabilization and purification steps are made essentially flow line and consecutive so that the oil may be purified as soon as possible after removal of the volatile constituents.

With most oils, a split stabilization process will be found to work very well, i. e., the crude is partially stabilized to reduce the vapor pressure of the oil to be purified to a satisfactory working range and then, after purification, the oil is further stabilized to the requisite low vapor pressure.

It is highly desirable that the oil subjected to the purification process be maintained under sufficient pressure to prevent any ebullition which would otherwise interfere with the process of separating the coalesced masses. Accordingly, the pressure imposed on the oil during the purification process should exceed the vapor pressure of the oil and/or water at the temperature employed, and, in general, should be equal to or greater than any previous minimum pressure to which the oil has been subjected. The previous minimum pressure to which the advancing stream of oil has been subjected is determinative of its vapor pressure, particularly if such minimum pressure was maintained on the crude while the latter was at elevated temperatures approaching those used in desalting, as in the flash tower 20 or tank 50. The advancing stream is preferably maintained at all times under superatmospheric pressure, but it is usually desirable to provide repressuring means, such as pump 56, immediately ahead of the desalting equipment in order that the advancing oil stream may be brought to a superatmospheric pressure greater than that minimum superatmospheric pressure to which the oil has been previously subjected.

In many instances, the oil is best treated in a plurality of treaters, as shown in the drawings. It is highly desirable under such circumstances to maintain substantially the same conditions as regards electric treatability, and the like, in each treater, whereby uniformity of treatment may be insured and the entire process of treatment made more or less automatic. I find that the desired uniformity is very much more readily obtainable if the water is dispersed in the oil while flowing as a single stream, whereby identical portions of the dispersions thus formed may be diverted to each treater. The uniformity of treatment is further insured by manifolding the pressure-responsive oil discharge to each treater, whereby the same desired operating pressure may be maintained in each treater, and also by manifolding the water draw-off line so that the same interfacial level may be established in each treater, this latter factor being of substantial importance in maintaining uniform auxiliary treating fields between the lower electrodes and the body of water in each treater.

As one example of my process, crude oil containing 4 to 5% of water or brine, and from 150 to 800 grams of salt per barrel, was produced under pressure of about 2000 lbs./sq. in. and a temperature of about 150° F. The pressure on this crude was reduced in the gas trap 14 to about 400 lbs./sq. in. and the separated gases were sent to a vapor recovery process, the fixed gases from the vapor recovery being recompressed and sent back into the formation to maintain pressure. The pressure was further reduced in flash tower 20 to less than 100 lbs./sq. in., the oil reaching the surge tank 50 at a pressure of from 20 to 50 lbs./sq. in. and a temperature of from 150 to 170° F., depending upon the quantity of heat supplied through interchangers 17 and 35. A small proportion of an emulsion-breaking chemical was added to the stream entering tank 50 by means of line 37 and some water or brine separated in tank 50. The effluent oil from tank 50 contained from 1 to 3% of water or brine. The oil was repressured by means of pump 56 to a pressure of from 80 to 120 lbs./sq. in. and a similar water pressure was developed by pump 73 for injection, the water used for this purpose being a relatively fresh water, that is, a water containing substantially less saline impurities than the brine associated with the oil. From 10 to 20% of water was added at the juncture point 71 and dispersed by means of the weight-loaded valve 100, a pressure drop being set up across this valve of from 40 to 80 lbs./sq. in., or thereabouts. The desalters or purifying units were normally maintained at a pressure of 45 to 50 lbs./sq. in. and the purified oil flowing therefrom contained about 1% of relatively fresh water, the salt content of the purified oil being less than 10 grams per barrel. This purified crude was re-pressured by means of pump 131 to a pressure of about 175 lbs./sq. in.

and heated in interchanger 142 for flashing in stabilization tower 143, the bottoms of which represented a stabilized purified crude suitable for storage or for direct charging into the usual distillation unit.

The details of the above examples are illustrative rather than limiting and various modifications of the described embodiments may be practiced without departing from the essence of my invention as defined by the scope of the appended claims.

This application is a division of my application Serial No. 322,093, entitled Method and apparatus for treating oil, filed March 4, 1940.

I claim as my invention:

1. A process for removing water-dispersible impurities from a stream of crude oil containing same and which stream is flowing at a non-uniform rate, which process includes the steps of: proportioning into said flowing stream of oil and mixing therewith a stream of relatively fresh water to form a stream of artificial oil-continuous emulsion in which droplets of said relatively fresh water coexist with water-dispersible impurities; dividing this resulting stream of oil-continuous emulsion into a plurality of separate streams; establishing a plurality of separate high-intensity coalescing electric fields in a plurality of separated settling spaces disposed approximately at the same level, the number of fields and the number of settling spaces corresponding to the number of said separate streams; delivering said separate streams respectively to said high-intensity electric fields to coalesce the dispersed water and bring the water-dispersible impurities into association therewith and separating the electrically-treated constituents of each separate stream in its corresponding settling zone to produce therein bodies of purified oil and water, said separated water now containing in large measure the water-dispersible impurities; withdrawing streams of water simultaneously from each of said settling zones and combining said streams; controlling the rate of flow of water in the combined stream in response to changes in the total amount of separated water in only one of said separating zones and in a manner to maintain the total amount of separated water in this one of said separating zones substantially constant; withdrawing streams of oil from the upper ends of said separate settling zones and combining these streams to form a combined stream of purified oil; and throttling the combined stream of purified oil while increasing and decreasing the throttling action in response to changes in pressure of said combined stream and in a manner to maintain the pressure in said settling zones substantially constant.

2. A process for removing water-dispersible impurities from an oil, which process includes the steps of: continuously mixing with a stream of said oil a stream of relatively fresh water to form a stream of artificial oil-continuous emulsion; dividing the resulting stream of oil-continuous emulsion into a plurality of separate streams; establishing a plurality of separate high-intensity coalescing electric fields in a plurality of separated settling spaces disposed approximately at the same level, the number of fields and the number of settling spaces corresponding to the number of said separate streams; delivering said separate streams respectively to said high-intensity electric fields to coalesce the dispersed water and bring the water-dispersible impurities into association therewith; separating the electrically-treated constituents of each separate stream in its corresponding settling zone to produce therein bodies of purified oil and separated water, said separated water now containing in large measure the water-dispersible impurities; withdrawing streams of oil from the upper ends of said settling zones and combining these streams; throttling the combined stream of purified oil while increasing and decreasing the throttling action in response to changes in pressure of said combined stream at a position upstream from the throttling position and in a manner to maintain the pressure in said settling zones substantially constant; withdrawing streams of water simultaneously from each of said settling zones and combining these streams; and controlling the rate of flow of water in the combined stream of water in response to changes in the total amount of separated water in only one of said separating zones and in a manner to maintain the total amount of separated water in this one of said separating zones substantially constant.

LOGAN C. WATERMAN.